United States Patent
Jang et al.

(10) Patent No.: US 10,289,421 B2
(45) Date of Patent: May 14, 2019

(54) BOOTING OF IHS FROM SSD USING PCIE

(71) Applicant: Dell Products, L.P., Round Rock, TX (US)

(72) Inventors: Young Hwan Jang, Gyeonggi-do (KR); Simon Kan, Hillbrooks (SG)

(73) Assignee: Dell Products, L.P., Round Rock, TX (US)

( * ) Notice: Subject to any disclaimer, the term of this patent is extended or adjusted under 35 U.S.C. 154(b) by 261 days.

(21) Appl. No.: 15/436,727

(22) Filed: Feb. 17, 2017

(65) Prior Publication Data

US 2018/0239609 A1     Aug. 23, 2018

(51) Int. Cl.
  *G06F 9/44*     (2018.01)
  *G06F 13/42*    (2006.01)
  *G06F 3/06*     (2006.01)
  *G06F 9/4401*   (2018.01)

(52) U.S. Cl.
  CPC .......... *G06F 9/4401* (2013.01); *G06F 9/4406* (2013.01); *G06F 13/4282* (2013.01); *G06F 13/4295* (2013.01); *G06F 2213/0026* (2013.01)

(58) Field of Classification Search
  None
  See application file for complete search history.

(56) References Cited

U.S. PATENT DOCUMENTS

| | | | | |
|---|---|---|---|---|
| 6,073,232 A * | 6/2000 | Kroeker | ............... | G06F 3/0607 713/1 |
| 6,920,533 B2 * | 7/2005 | Coulson | ............... | G06F 9/4401 711/118 |
| 7,181,608 B2 * | 2/2007 | Fallon | ................... | G06F 3/0613 713/2 |
| 7,409,537 B2 * | 8/2008 | Tsang | .................... | G06F 9/4418 713/1 |
| 7,676,671 B2 * | 3/2010 | Van Rooyen | ......... | G06F 9/4401 713/1 |
| 7,886,140 B2 * | 2/2011 | Jiang | ..................... | G06F 9/4408 713/1 |

(Continued)

FOREIGN PATENT DOCUMENTS

JP     2016119108 A  *  6/2016  .......... G06F 9/4406

OTHER PUBLICATIONS

Google Machine Translation of KR 20080057688 A, Jun. 25, 2008. (Year: 2008).*

*Primary Examiner* — Steven G Snyder
(74) *Attorney, Agent, or Firm* — Fogarty LLP

(57) ABSTRACT

Methods and systems are provided for initializing a host IHS (Information Handling System) that includes an SSD (solid state storage device) connected using PCIe (Peripheral Component Interconnect Express). The SSD detects the transfer of boot data from the host to the persistent storage of the SSD. The SSD marks the detected boot data for pre-fetching. When the host is booted, memory is allocated for the PCIe connection. During the resulting delay, the SSD pre-fetches the marked boot data from persistent storage to a portion of a volatile memory used by the SSD for storing a mapping of the boot data in persistent storage. Upon configuring the PCIe connection, the SSD is provides pre-fetched boot data to the host immediately, thus improving boot times. In certain scenarios, the SSD pre-fetches successive portions of the boot data and provides each pre-fetched portion of the boot data to the host.

20 Claims, 4 Drawing Sheets

(56) References Cited

U.S. PATENT DOCUMENTS

| | | | | |
|---|---|---|---|---|
| 8,151,102 B2* | 4/2012 | Itoh | G06F 9/4401 | 710/104 |
| 8,225,079 B2* | 7/2012 | Smith | G06F 9/4406 | 711/162 |
| 8,230,208 B2* | 7/2012 | Van De Ven | G06F 9/4406 | 713/2 |
| 8,266,418 B2* | 9/2012 | Yun | G06F 1/1616 | 713/1 |
| 8,296,555 B2* | 10/2012 | Chu | G06F 9/4406 | 713/1 |
| 8,327,066 B2* | 12/2012 | Heo | G06F 12/0246 | 711/103 |
| 8,352,706 B2* | 1/2013 | Yano | G06F 12/0246 | 711/100 |
| 8,423,754 B2* | 4/2013 | Lee | G06F 9/4401 | 713/2 |
| 8,429,677 B2* | 4/2013 | Shu | G06F 3/061 | 719/321 |
| 8,874,887 B2* | 10/2014 | Mruthyunjaya | G06F 9/4401 | 711/104 |
| 8,904,088 B2* | 12/2014 | Heo | G06F 12/0246 | 711/103 |
| 9,015,461 B2* | 4/2015 | Van De Ven | G06F 9/4406 | 713/2 |
| 9,170,823 B2* | 10/2015 | Ma | G06F 9/4406 | |
| 9,329,873 B2* | 5/2016 | Bi | G06F 9/4406 | |
| 9,910,786 B2* | 3/2018 | Freyensee | G06F 12/10 | |
| 10,073,703 B2* | 9/2018 | Van De Ven | G06F 9/4406 | |
| 2001/0039612 A1* | 11/2001 | Lee | G06F 9/4406 | 713/2 |
| 2002/0091917 A1* | 7/2002 | Liao | G06F 9/4408 | 713/1 |
| 2005/0198485 A1* | 9/2005 | Nguyen | G06F 9/4406 | 713/1 |
| 2008/0082812 A1* | 4/2008 | Kirshenbaum | G06F 9/4401 | 713/2 |
| 2008/0209198 A1* | 8/2008 | Majni | G06F 9/4401 | 713/2 |
| 2008/0256295 A1* | 10/2008 | Lambert | G06F 9/4406 | 711/118 |
| 2009/0158023 A1* | 6/2009 | Kern | G06F 9/4401 | 713/2 |
| 2009/0249055 A1* | 10/2009 | Itoh | G06F 9/4401 | 713/2 |
| 2010/0017591 A1* | 1/2010 | Smith | G06F 9/4406 | 713/2 |
| 2010/0268927 A1* | 10/2010 | De Ven | G06F 9/4406 | 713/2 |
| 2011/0238971 A1* | 9/2011 | Heo | G06F 12/0246 | 713/2 |
| 2014/0215199 A1* | 7/2014 | Ma | G06F 9/4406 | 713/2 |
| 2014/0229724 A1* | 8/2014 | Chen | G06F 9/4405 | 713/2 |
| 2015/0324118 A1* | 11/2015 | McCambridge | G06F 3/0613 | 710/5 |
| 2015/0324120 A1* | 11/2015 | Wu | G06F 3/065 | 711/103 |
| 2015/0324132 A1* | 11/2015 | Chen | G06F 3/0611 | 711/159 |
| 2015/0324137 A1* | 11/2015 | Wu | G06F 3/0619 | 713/2 |
| 2017/0123995 A1* | 5/2017 | Freyensee | G06F 12/10 | |
| 2018/0024919 A1* | 1/2018 | Geml | G06F 3/061 | 711/103 |
| 2018/0321987 A1* | 11/2018 | Benisty | G06F 9/528 | |

* cited by examiner

BOOTING OF IHS FROM SSD USING PCIE

FIELD

This disclosure relates generally to solid state storage devices (SSDs), and more specifically, to improving initialization of SSDs installed as components of an Information Handling System (IHS).

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An IHS typically includes one or more persistent (i.e., non-volatile) data storage devices. For many years, IHSs relied on magnetic disk storage devices for persistent storage. As solid state storage devices (SSDs) have become increasingly affordable, they are an increasingly common choice for persistent storage for use by an IHS. When compared to conventional magnetic disk storage devices, solid state storage devices typically support faster read and write operations. In addition, solid state storage devices are suitable for certain mobile device applications due to the stresses that mobile devices may place on the spinning and otherwise moving parts of magnetic disk storage devices.

A solid state storage device may be accessed by a host IHS using a bus protocol that is supported by the SSD. As solid state storage devices began to rise in popularity, SATA (Serial ATA) was a common bus protocol utilized to interface with SSDs. More recently, PCIe (Peripheral Component Interconnect Express) has emerged as an increasingly common bus protocol supported by solid state storage device. One aspect of the emerging popularity of PCIe as an SSD bus protocol is the support in PCIe for faster bus speeds when compared to connections using SATA.

A solid state storage device may utilize NVMe (Non-Volatile Memory Express) in order to communicate data with a host IHS over a high-bandwidth connection provided by a PCIe bus interface. NVMe is a logical device interface that has been designed and optimized to operate efficiently over a PCIe bus interface. When utilized in conjunction with NVMe, a PCIe bus interface provides up to six times faster transfer speeds when compared to a SATA bus interface. One aspect of NVMe support for PCIe is the use of various high-speed queues by the host IHS. These high speed queues are used by the host IHS to buffer commands to be issued to a supported SSD and to buffer communications received from the SSD in response to the processing of issued commands. The queues utilized by a PCIe NVMe bus interface connection to an SSD are typically initialized and run from a volatile memory of the host IHS.

Even though PCIe supports faster bus speeds that SATA, a PCIe bus connection may be slower to initialize than a SATA bus interface connection. When used to interface with solid state storage devices, the faster bus speeds supported by PCIe benefit overall user experience in the form of faster booting of the SSD and faster data retrieval, resulting in faster loading and operation of software applications. However, in order to support these higher bus speeds, the various queues utilized by the host IHS must be initialized. Each time an IHS is booted or restarted, both the bus connection attaching a solid state storage device and the solid state storage device itself must be initialized and the high speed queues must be initialized by the host IHS before the solid state storage device is ready for use. When initializing a PCIe-connected SSD upon booting of a host IHS, it may take in the range of 500-2000 milliseconds to complete initialization of the SSD and the PCIe connection. In comparison, initialization of a SATA connected SSD may be accomplished in the range of 100-200 milliseconds.

In order to improve overall boot speeds, certain IHSs may be configured to utilize optimized boot procedures that rely on operating system (OS) boot files that include data necessary to boot key drivers and other critical data needed to initialize basic IHS capabilities. For instance, in WINDOWs operating systems, fast startup procedures utilize an OS boot file that may be known as a "session 0" boot file. Similar to hibernation power-saving techniques utilized by certain IHSs, in fast startup procedures, certain aspects of the IHS state are captured and stored to persistent memory prior to ending an IHS session (e.g., rebooting or powering down the IHS). However, unlike the large boot files used for hibernation of an IHS, fast startup procedure typically utilize much smaller boot files that can be loaded and executed much more quickly. Upon powering an IHS supporting such fast startup procedures, the IHS retrieves the OS boot file from persistent storage and uses the retrieved data to quickly initialize core IHS functionality.

SUMMARY

Certain described embodiments provide methods for initializing a host IHS (Information Handling System) that includes a solid state storage device. In various embodiments, the method includes initializing a PCIe (Peripheral Component Interconnect Express) connection between the host IHS and the solid state storage device; allocating a host memory on the host IHS, wherein the allocated host memory supports data transfers via the PCIe connection with the solid state storage device; loading a first set of mappings in a first portion of a volatile memory of the solid state storage device, wherein the first set of mappings identifies the location of the operating system boot data in a persistent storage of the solid state storage device; pre-fetching at least a first portion of the operating system boot data, wherein the at least first portion of the operating system boot data is pre-fetched during at least a portion of a time required for the host memory to be allocated, and wherein pre-fetching the at least first portion of the operating system boot data comprises using the first set of mappings to identify the location of the at least first portion of the operating system boot data in persistent storage and copying the at least first portion of the located operating system boot data from the persistent storage to a second portion of the volatile memory of the solid state storage device; transmitting the pre-fetched at least first portion of the operating system boot data to the host IHS; and booting the host IHS from the pre-fetched at least first portion of the operating system boot data.

In certain additional method embodiments, the PCIe connection utilizes NVMe (Non-Volatile Memory Express) and wherein the host memory is allocated for use as a plurality of NVMe queues. In certain additional method embodiments, the first set of mappings is a set of FTL (Flash Translation Layer) mappings that encode the storage location of data in the persistent storage of the solid state storage device. In certain additional method embodiments, the methods further include detecting an end of session command issued by the host IHS; and identifying the location of the operating system boot data stored in the persistent storage of the solid state storage device, wherein the operating system boot data is located by determining a last block of data received for storage from the host IHS prior to the detected end of session command. In certain additional method embodiments, the methods further include determining the first set of mappings corresponding to the storage location of the identified last block of data in the persistent storage; and storing the first set of mappings to a predefined location in persistent storage of the solid state storage device. In certain additional method embodiments, the size of the located operating system boot data in persistent storage is greater than the size of the second portion of the volatile memory of the solid state storage device. In certain additional method embodiments, the methods further include pre-fetching a second portion of the located operating system boot data, wherein the second portion of the located operating system boot data is pre-fetched after the pre-fetched first portion of the operating system boot data has been transmitted to the host IHS, and wherein pre-fetching the second portion of the operating system boot data comprises transferring the second portion the operating system boot data from the persistent storage to the second portion of a volatile memory of the solid state storage device. In certain additional method embodiments, the methods further include transmitting the pre-fetched second portion of the operating system boot data to the host IHS; and booting the host IHS from the pre-fetched first portion of the operating system boot data and the pre-fetched second portion of the operating system boot data.

Additional described embodiments provide a host IHS (Information Handling System) that includes a host memory allocated to support data transfers via a PCIe (Peripheral Component Interconnect Express) connection to a solid state storage device; the solid state storage device comprising a PCIe bus interface connection, a persistent storage, a volatile memory, and a controller, wherein the controller is configured to: load a first set of mappings in a first portion of the volatile memory, wherein the first set of mappings identifies the location of operating system boot data in the persistent storage; pre-fetch at least a first portion of the operating system boot data, wherein the at least first portion of the operating system boot data is pre-fetched during at least a portion of a time required for the host memory to be allocated, and wherein pre-fetching the at least first portion of the operating system boot data comprises using the first set of mappings to identify the location of the at least first portion of the operating system boot data in persistent storage and copying the at least first portion the located operating system boot data from the persistent storage to a second portion of the volatile memory; and transmit the pre-fetched at least first portion of the operating system boot data to the host IHS via the PCIe bus interface connection; and a processor configured to boot the host IHS from the pre-fetched at least first portion of the operating system boot data transmitted by the solid state storage device.

In certain additional IHS embodiments, the PCIe connection utilizes NVMe (Non-Volatile Memory Express) and wherein the host memory is allocated for use as a plurality of NVMe queues. In certain additional IHS embodiments, the first set of mappings is a set of FTL (Flash Translation Layer) mappings that encode the storage location of data in the persistent storage. In certain additional IHS embodiments, the controller is configured to: detect an end session command issued by the host IHS; and identify the location of operating system boot data stored in the persistent storage of the solid state storage device, wherein the operating system boot data is located by determining the last block of data received for storage from the host IHS prior to the detected end of session command. In certain additional IHS embodiments, the controller is configured to: determine the first set of mappings corresponding to the storage location of the identified last block of data in the persistent storage; and store the first set of mappings to a predefined location in persistent storage of the solid state storage device. In certain additional IHS embodiments, the size of the located operating system boot data in persistent storage is greater than the size of the second portion of the volatile memory. In certain additional IHS embodiments, the controller is further configured to: pre-fetch a second portion of the located operating system boot data, wherein the second portion of the located operating system boot data is pre-fetched after the pre-fetched first portion of the operating system boot data has been transmitted to the host IHS, and wherein pre-fetching the second portion of the operating system boot data comprises transferring the second portion the operating system boot data from the persistent storage to the second portion of a volatile memory.

Additional described embodiments provide a solid state storage device that includes a PCIe bus interface connection (Peripheral Component Interconnect Express) to a host IHS, wherein the host IHS includes a host memory allocated to support data transfers via the PCIe connection to the solid state storage device; a persistent storage; a volatile memory; and a controller, wherein the controller is configured to: load a first set of mappings in a first portion of the volatile memory, wherein the first set of mappings identifies the location of operating system boot data in the persistent storage; pre-fetch at least a first portion of the operating system boot data, wherein the at least first portion of the operating system boot data is pre-fetched during at least a portion of a time required for the host memory to be allocated, and wherein pre-fetching the at least first portion of the operating system boot data comprises using the first set of mappings to identify the location of the at least first portion of the operating system boot data in persistent storage and copying the at least first portion the located operating system boot data from the persistent storage to a second portion of the volatile memory; and transmit the pre-fetched at least first portion of the operating system boot data to the host IHS via the PCIe bus interface connection, wherein the host IHS is configured to boot from the pre-fetched at least first portion of the operating system boot data.

In certain additional state storage device embodiments, the controller is further configured to: detect an end session command issued by the host IHS; and identify the location of operating system boot data stored in the persistent storage of the solid state storage device, wherein the operating system boot data is located by determining the last block of data received for storage from the host IHS prior to the detected end of session command. In certain additional state storage device embodiments, the controller is further configured to determine the first set of mappings corresponding to the storage location of the identified last block of data in the persistent storage; and store the first set of mappings to a predefined location in persistent storage of the solid state storage device. In certain additional state storage device embodiments, the size of the located operating system boot data in persistent storage is greater than the size of the second portion of the volatile memory. In certain additional state storage device embodiments, the controller is further configured to pre-fetch a second portion of the located operating system boot data, wherein the second portion of the located operating system boot data is pre-fetched after the pre-fetched first portion of the operating system boot data has been transmitted to the host IHS, and wherein pre-fetching the second portion of the operating system boot data comprises transferring the second portion the operating system boot data from the persistent storage to the second portion of a volatile memory.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Figure 1:
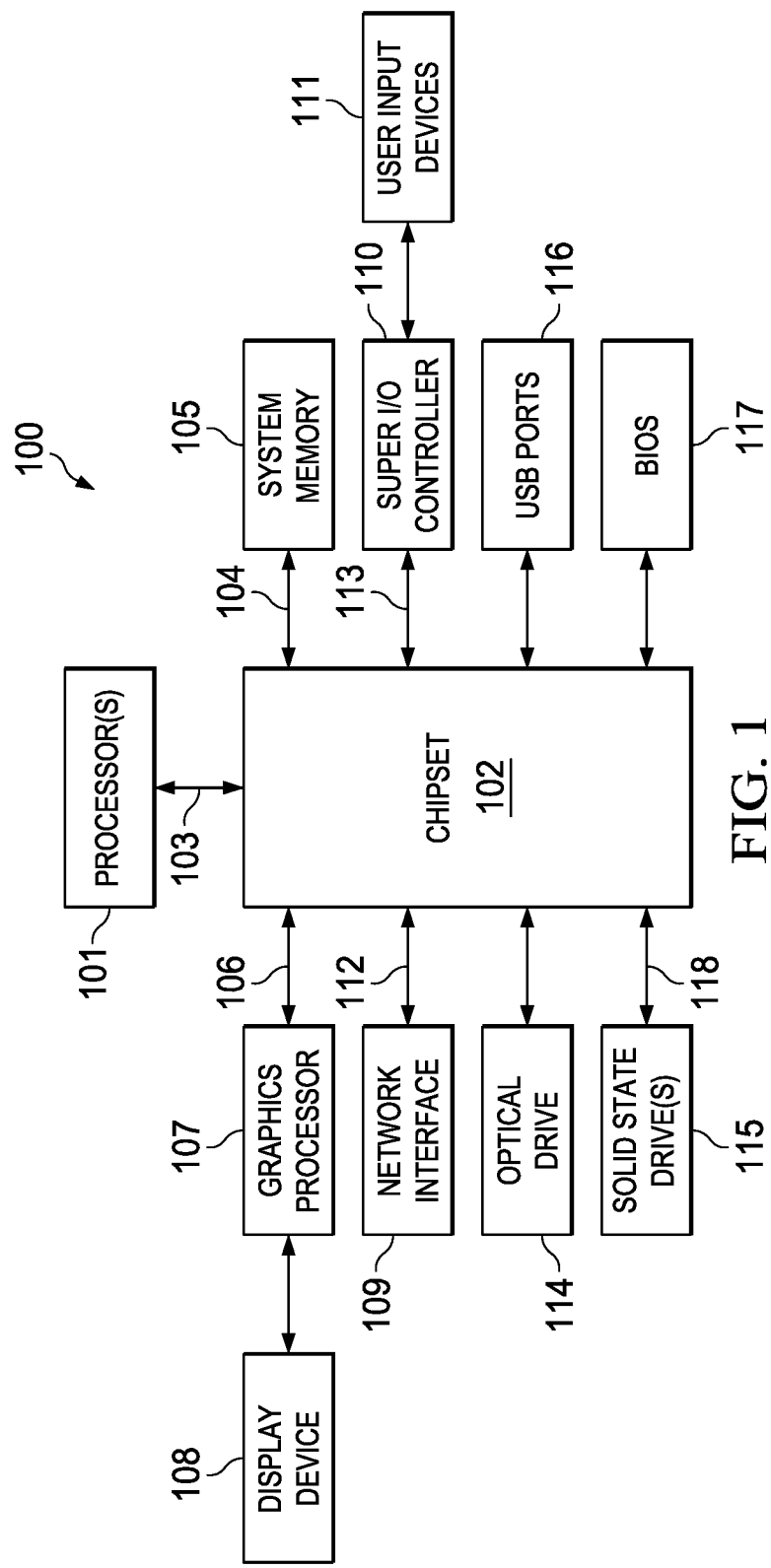
FIG. 1 is a block diagram depicting certain components of an IHS configured according to various embodiments to interface with a solid state storage device.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows various internal components of an example IHS configured to implement the provided embodiments. It should be appreciated that although certain embodiments described herein may be discussed in the context of a laptop or other personal computing devices, other embodiments may be utilized with various other types of computing devices.

FIG. 1 is a block diagram of an IHS 100 configured according to certain embodiments to interface with a solid state storage device 115 using a PCIe NVMe connection according to various embodiments. IHS 100 may include one or more processors 101. In various embodiments, IHS 100 may be a single-processor system including one processor 101, or a multi-processor system including two or more processors 101. Processor(s) 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

IHS 100 includes a chipset 102 that may include one or more integrated circuits that are connect to processor(s) 101. In certain embodiments, the chipset 102 may utilize a QPI (QuickPath Interconnect) bus 103 for communicating with the processor(s) 101. Chipset 102 provides the processor(s) 101 with access to a variety of resources. For instance, chipset 102 provides access to system memory 105 over memory bus 104. System memory 105 may be configured to store program instructions and/or data accessible by processors(s) 101. In various embodiments, system memory 105 may be implemented using any suitable memory technology, such as static RAM (SRAM), dynamic RAM (DRAM) or nonvolatile/Flash-type memory.

Chipset 102 may also provide access to a graphics processor 107. In certain embodiments, graphics processor 107 may be comprised within one or more video or graphics cards that have been installed as components of the IHS 100. Graphics processor 107 may be coupled to the chipset 102 via a graphics bus 106 such as provided by an AGP (Accelerated Graphics Port) bus or a PCIe (Peripheral Component Interconnect Express) bus. In certain embodiments, a graphics processor 107 generates display signals and provides them to a display device 108.

In certain embodiments, chipset 102 may also provide access to one or more user input devices 111. In such embodiments, chipset 102 may be coupled to a super I/O controller 110 that provides interfaces for a variety of user input devices 111, in particular lower bandwidth and low data rate devices. For instance, super I/O controller 110 may provide access to a keyboard and mouse or other peripheral input devices. In certain embodiments, super I/O controller 110 may be used to interface with coupled user input devices 111 such as keypads, biometric scanning devices, and voice or optical recognition devices. The I/O devices, such as may interface super I/O controller 110 through wired or wireless connections. In certain embodiments, the super I/O controller 110 may be coupled to the super I/O controller 110 via a Low Pin Count (LPC) bus 113.

Other resources may also be coupled to the processor(s) 101 of the IHS 100 through the chipset 102. In certain embodiments, chipset 102 may be coupled to a network interface 109, such as provided by a Network Interface Controller (NIC) that is coupled to the IHS 100. In certain embodiments, the network interface 109 may be coupled to the chipset 102 via a PCIe bus 112. According to various embodiments, network interface 109 may support communication via various wired and/or wireless networks. In certain embodiments, the chipset 102 may also provide access to one or more Universal Serial Bus (USB) ports 116.

Chipset 102 also provides access to one or more solid state storage devices 115. The chipset 102 utilizes a PCIe bus interface connection 118 in order to communication with the solid state storage device 115. In certain embodiments, chipset 102 may also provide access to other types of storage devices. For instance, in addition to the solid state storage device 115, an IHS 100 may also utilize one or more magnetic disk storage devices, or other types of the storage devices such as an optical drive or a removable-media drive. In various embodiments, the solid state storage device 115 may be integral to the IHS 100, or may be located remotely from the IHS 100.

Another resource that may be accessed by processor(s) 101 via chipset 102 is a BIOS (Basic Input/Output System) 117. As described in more detail below with respect to additional embodiments, upon powering or restarting IHS 100, processor(s) 101 may utilize BIOS 117 instructions to initialize and test hardware components coupled to the IHS 100 and to load an operating system for use by the IHS 100. The BIOS 117 provides an abstraction layer that allows the operating system to interface with certain hardware components that are utilized by IHS 100. Via this hardware abstraction layer provided by BIOS 117, the software executed by the processor(s) 101 of IHS 100 is able to interface with certain I/O devices that are coupled to the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
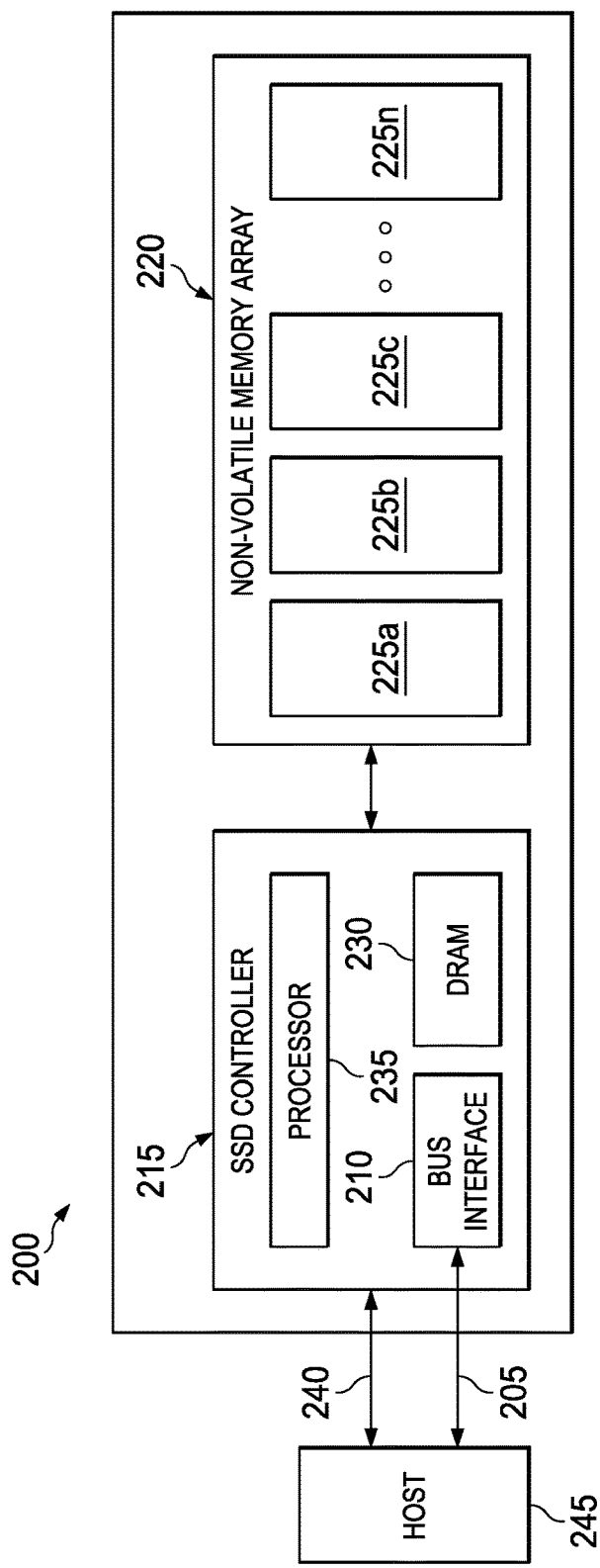
FIG. 2 is block diagram depicting certain components of a solid state storage device according to various embodiments.

FIG. 2 is diagram illustrating certain components of a solid state storage device 200 connected to a host IHS 245 according to various embodiments. The solid state storage device 200 may be utilized to store information during operation of an IHS 100 according to embodiments such as described with respect to FIG. 1. In the embodiment of FIG. 1, an IHS 100 utilizes a bus interface 118 to communicate with a solid state storage device 115. In the embodiment of FIG. 2, this connection between the solid state storage device 200 and the host IHS 245 utilizes a bus interface connection 205. The bus interface connection 205 may be any physical connection capable of supporting a PCIe bus interface connection between the host IHS 245 and the solid state storage device 200.

In the embodiment of FIG. 2, the solid state storage device 200 includes an SSD controller 215. In various embodiments, the SSD controller 215 may include a processing component 235 such as a microprocessor, microcontroller, application-specific integrated circuit (ASIC), or field-programmable gate array (FPGA). In various embodiments, the SSD controller 215 may include an internal memory 230. In the described embodiment, the internal memory 230 may be referred to as DRAM memory or volatile memory. Other embodiments may utilize other memory technologies to implement the internal memory 230 of the solid state storage device 200. The processor 235 of the SSD controller 215 may be used to execute software code, in particular firmware and/or machine software code that implements the read and write operations supported by the SSD controller. These supported read and write operations may be used to access a non-volatile memory array 220 that provides the main storage of the solid state storage device 200 that is typically available to the operating system of the host IHS.

The non-volatile memory array 220 may be comprised of one or more separate memory elements 225a-n that may be flash memory or any other solid-state memory. In certain embodiments, the individual memory elements 225a-n are NAND flash memory elements that are organized into arrays. In certain embodiments, the SSD controller may utilize a second connection 240 to the host IHS, by which the SSD controller may receive certain commands from the host operating system, such as an end of session command informing the SSD controller that the host IHS is powering down or restarting.

In addition to providing access to the non-volatile memory array 220, the SSD controller 215 supports the transfer of data to and from the connected 205 IHS via a supported bus interface 210. As described above, PCIe utilizing NVMe has emerged as a common interface bus protocol 210 for a host IHS to communicate with solid state storage devices. A PCIe NVMe connection is well suited to transferring data between the SSD controller 215 and the host IHS 245. In formulating commands that access the NAND memory 220 of an SSD, the host IHS 245 does not utilize the actual address space of the NAND memory 220. Instead, the memory locations specified within the host IHS commands of the bus protocol are translated between the logical block address space utilized by the host IHS 245 and the physical address locations used by the NAND array 220. The SSD controller utilize a flash translation layer (FTL), which may be referred to as a map, to manage these translations between physical SSD flash memory addresses and the logical block addresses utilized by the host IHS 245. Used in this manner, the FTL emulates the block-level interface of the host IHS so that conventional, block addressing can be used by the host IHS 245 while interfacing with the NAND memory array 220 of the SSD 200, thus insulating the host IHS 245 from the complexities of the NAND memory address space.

In certain embodiments, the SSD controller 215 may be configured to periodically create a backup copy of the current FTL mapping currently in use. In certain of such embodiments, the SSD controller 215 may be configured to copy the FTL map from the volatile memory 230 to a designated location of the NAND memory array 220. In such embodiments, the SSD controller 215 may be configured to write each backup copy of the FTL map to a predefined address space in the NAND memory array 220, thus overwriting the previous copy with each backup of the FTL mapping.

Figure 3:
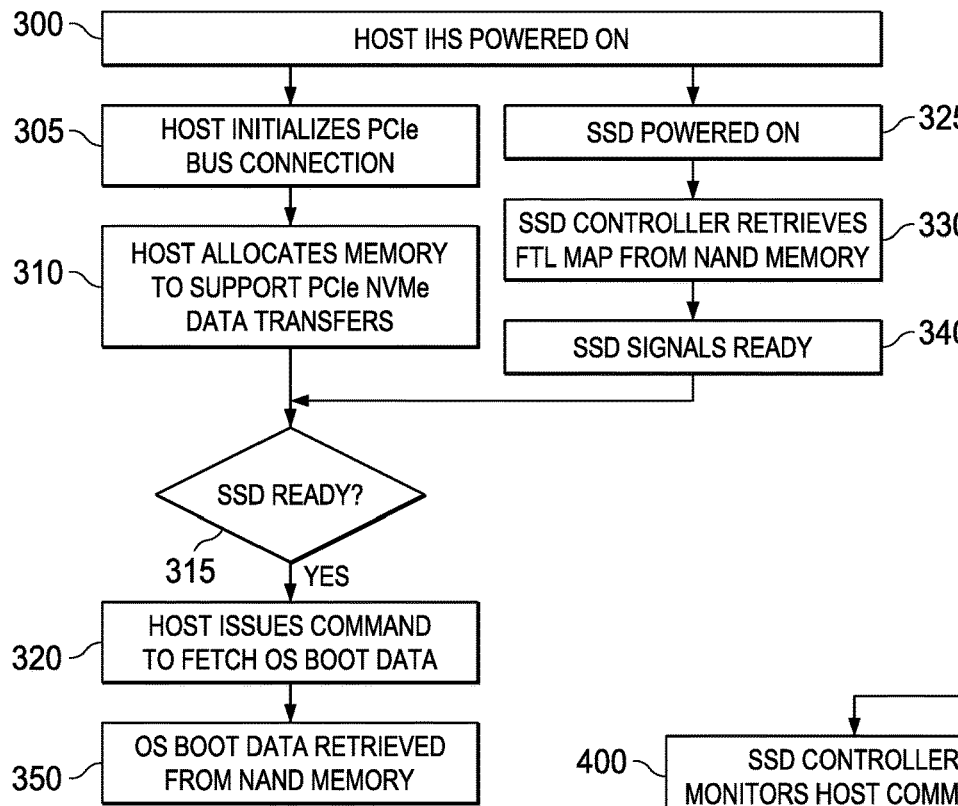
FIG. 3 is block diagram depicting certain steps of a process for initializing a solid state storage device connection to a host IHS.

FIG. 3 illustrates certain steps of a process for initializing a solid state drive that is connected to a host IHS. The scenario of FIG. 3 begins at step 300 with the powering or restarting of the host IHS. In the illustrated scenario, one path of execution continues at step 305 with the initialization of the PCIe bus connection by the host IHS. At step 310, the host IHS allocates memory to support the PCIe bus connection. As described above, in order to optimize the use of the high-speed PCIe bus connection, NVMe is a logical device interface that may be used to transfer data to and from the SSD via the PCIe bus connection. In order to support this high speed connection, a host IHS may initialize a set of queues that are used for high-speed operations, in particular dispatching NVMe commands and receiving responses to the dispatched commands. Once the memory for these queues has been allocated, at step the 315 the host IHS determines whether the SSD has been initialized.

Upon powering of the host IHS at step 300, another concurrent path of execution proceeds at step 325 with the SSD being powered on. At step 330, the SSD controller begins to configure the operation of the SSD by retrieving an FTL map from NAND memory. As described below, the SSD may write a copy of the FTL map to NAND memory upon detection an end of session signal from the operating system of the host IHS, thus indicating the host IHS is being powered down or restarted. In order to resume operation of the SSD upon booting, the SSD controller must generate or retrieve an FTL map that may be used to translate between the logical address space used by the host IHS and the physical address space used by the array of memory elements that make up a non-volatile memory array such as described with respect to FIG. 2.

At step 340, the SSD signals ready to commence receipt of NVMe commands from the host IHS and communicates this ready status to the host IHS. However, due to the lag resulting from the host IHS allocating memory to support the use of PCIe NVMe queues at step 310, the SSD may complete location and rebuilding of the FTL table and signal ready at step 340 prior to the host IHS completing the allocation of memory for the high speed queues. In such situations, the SSD and the host IHS may both remain idle while waiting for the completion of the allocation of memory at step 310. Upon completion of the memory allocation for the PCIe NVMe queues, at step 315 the host IHS determines if a ready signal has been received from the SSD. If a ready signal is detected from the SSD, at step 320 the host is ready to commence booting and issues one or more commands directing the SSD to retrieve operating system (OS) boot data that includes the instructions and data from which the host IHS boots an operating system. At step 350, the SSD locates the requested OS boot data in the persistent NAND memory of the SSD. Once the OS boot data is located, it is provided to the host IHS which may then commence booting the operating system.

Figure 4:
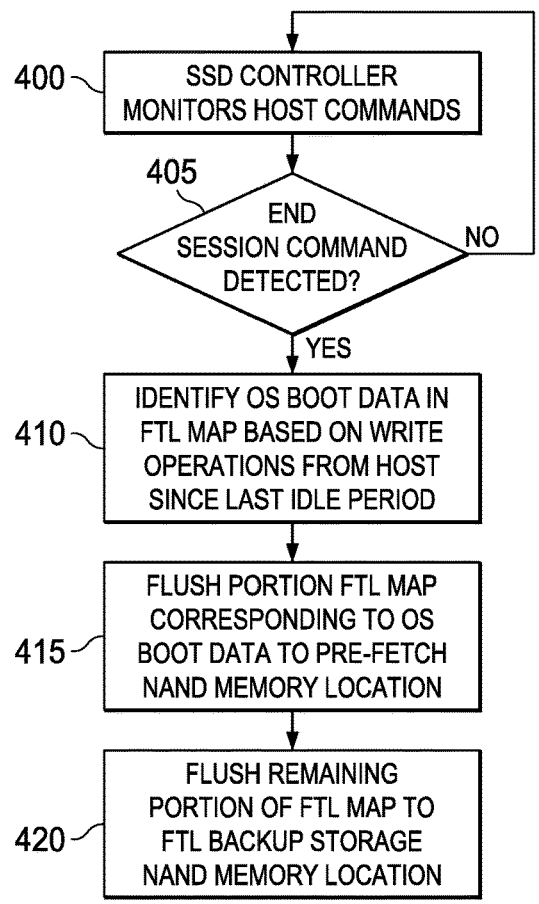
FIG. 4 is block diagram depicting certain steps of a process for capturing host IHS boot data by a solid state storage device according to various embodiments.

FIG. 4 illustrates certain steps of a process according to various embodiments by which an SSD connected to a host IHS may identify and store OS boot data that may be pre-fetched by the SSD in order to support faster boot times. As described above, a host IHS connected to an SSD may issue commands to the SSD controller either through the bus interface protocol by which read and write commands are transmitted to the SSD or through a separate command interface. Upon being powered down or restarted, the operating system of the host IHS may be configured to issue a notice signaling the end of the current operating system session. The operating system may be configured to transmit the end of session signal, but delay powering down the IHS to allow peripheral components of the IHS, such as an SSD, an opportunity to save state information to persistent memory.

Components of the host IHS such as an SSD may be configured to detect this end of session signal and to store state information to persistent memory before the IHS is powered down. In the case of an SSD, the SSD controller may be configured to respond to an end of session signal by flushing the current FTL map in use by the SSD to persistent NAND memory, where it can be retrieved and put to use when the host IHS is rebooted. In certain embodiments, the SSD controller may be configured to flush all data stored in volatile memory, including the FTL map, to NAND memory in response to detecting an end of session signal.

In certain embodiments, a host IHS may implement fast startup procedures that seek to reduce boot time by storing OS boot data that includes only certain drivers and other critical information needed for quickly booting the operating system. In such scenarios, upon an IHS receiving a command to shut down or restart, the operating system of the IHS may be configured to collect the OS boot data selected for fast startup and storing the collected data to persistent memory. In scenarios where the SSD is the boot device for the host IHS, the host IHS may send this collected OS boot data for storage to the persistent NAND storage of the SSD for retrieval upon booting. Upon transmitting the collected OS data to the SSD for storage, a host IHS may be configured to then issue an end of session command and maintain power for a brief interval to allow components such as the SSD to preserve state information to persistent storage.

At step 400 in the process of FIG. 4, an SSD controller according to embodiments may be configured to monitor commands issued by the operating system host IHS. In certain embodiments, the firmware of the SSD controller is configured to scan commands received from the operating system of the host IHS for end of session commands. At step 405, the SSD controller detects that an end of session command has been issued by the operating system host IHS. In certain embodiments, this end of session command may be a "session 0" command issued by a WINDOWS operating system.

If an end session command is detected at step 405, at step 410, the SSD controller identifies the mappings in the FTL map that encode the NAND memory storage location of the OS boot data that was transmitted by the host IHS immediately prior to issuing the end of session signal. In certain embodiments, timing information may be used to determine the FTL mappings that represent the OS boot data. For instance, idle periods in the operation of the SSD may be used to identify the OS boot data. As described, a solid state storage device supports significantly faster operations when compared to a magnetic disk storage drive. However, similar to magnetic disk storage drives, a solid state storage device is frequently idle as it awaits further instructions, even if the idle periods are of a short duration. Upon detecting an end of session signal, an SSD controller may be configured in certain embodiments to identify the FTL mappings that correspond to write operations since the last idle period of the SSD until the end of session command was detected by the SSD controller. As the data transmitted to storage immediately prior the end of session signal, this final block of data transmitted by the host IHS is presumed to be the OS boot data that will be used to support fast startup upon booting of the IHS. In certain scenarios, this block of data preceding an end of session signal may include data in addition to the actual OS boot data.

At step 415, the portion of the FTL mappings that have been identified as corresponding to the OS boot data is written to a location in NAND memory that has been designated for pre-fetching OS boot data according to the described embodiments. At step 420, the remaining portion of the FTL map that was not identified as OS boot data and stored to the designated pre-fetch location is stored to a separate location in NAND memory from the pre-fetch location used to store the OS boot data FTL mappings. For instance, the remaining portion of the FTL map may be flushed to a NAND memory location designated for storing backup copies of the FTL map that may be periodically created by the SSD controller. In certain embodiments, the SSD may be configured to use any remaining time before power is lost to flush additional data from volatile memory to persistent NAND memory.

Figure 5:
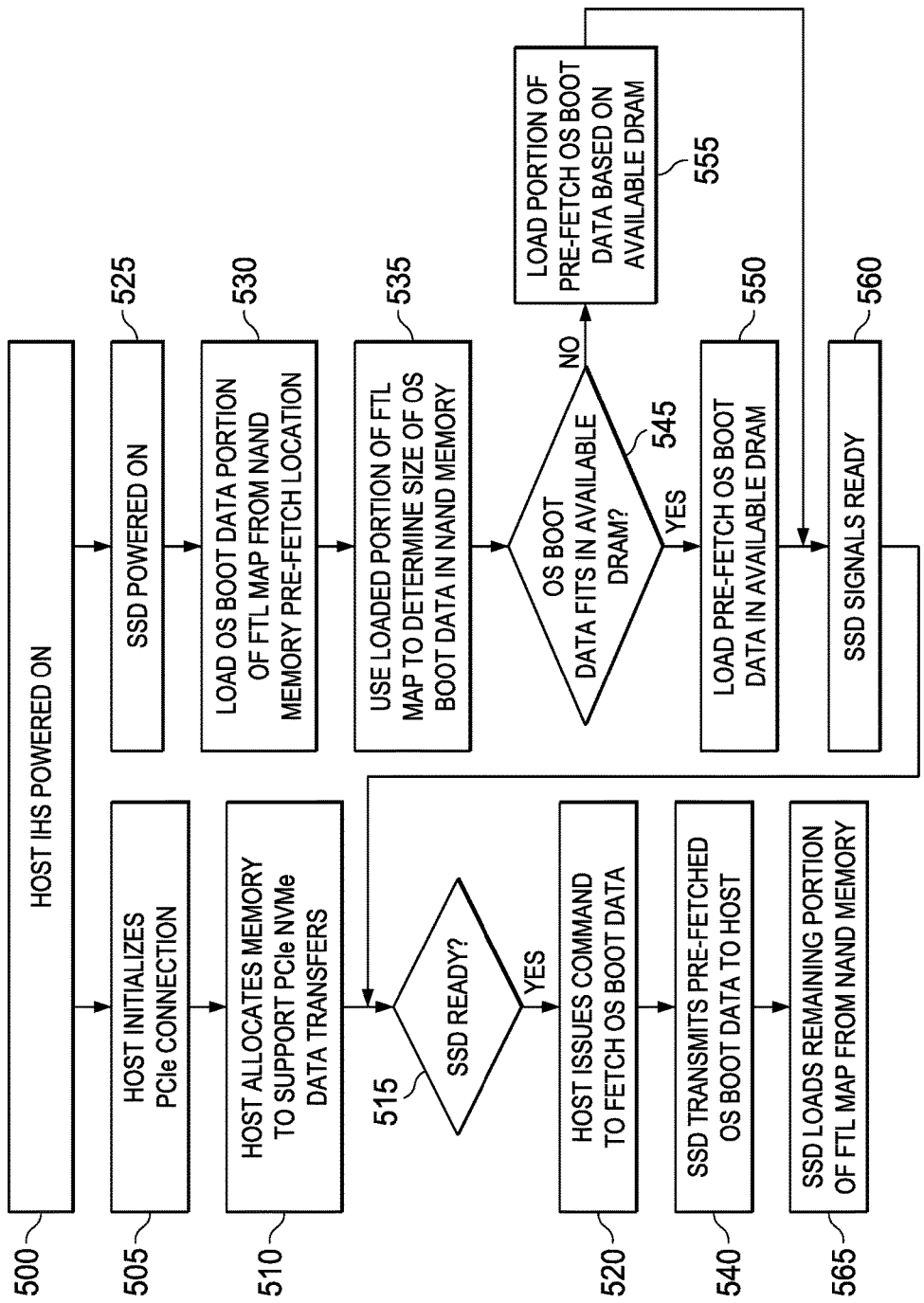
FIG. 5 is block diagram depicting certain steps of a process according to various embodiments for pre-fetching data used to initialize a solid state storage device connection to a host IHS.

FIG. 5 illustrates certain steps of a process for the prefetching OS boot data by an SSD according to various embodiments. As with the process of FIG. 3, the illustrated process also begins at step 500 with the host IHS being powered. As before, the host IHS initializes the PCIe connection at step 505 and the host IHS allocates memory for PCIe NVMe queues at step 510. Also as in FIG. 3, at step 515, the host IHS determines whether the SSD has been initialized and is in a state ready to receive NVMe commands. In the scenario of FIG. 3, the delay caused by the host IHS allocating memory for the PCIe NVMe queues results in the SSD completing its initialization, signaling ready and idling along with the host IHS until the allocation of memory is complete and the host IHS is ready to issue a command requesting the SSD fetch the OS boot data that was collected by the operating system of the host IHS in order to support fast booting of the host IHS.

In the embodiment of FIG. 5, the SSD is configured to pre-fetch OS boot data during the delay resulting from the allocation of queuing memory by the host IHS. As with FIG. 3, at step 525, the SSD is powered on in response the IHS being powered on at step 500. At step 530, the SSD controller loads the FTL mappings for the OS boot data that were stored in the designated pre-fetch location in NAND memory. With the FTL mappings for the OS boot data loaded in volatile memory, at step 535, the SSD controller uses these FTL mappings to determine the size of the OS boot data that was stored in NAND memory. In certain embodiments, the FTL mappings for the OS boot data may be used to determine the size of the OS boot data. In certain embodiments, the SSD may utilize these FTL mappings to identify the OS boot data in NAND memory in order to determine the size of the OS boot data.

Once the SSD has determined the size of the OS boot data stored in NAND memory, at step 545, the SSD determines whether the entire OS boot data file may be pre-fetched to the volatile memory of the SSD. As described, the SSD utilizes a portion of the available volatile memory in order to store the FTL mappings that are used to retrieve the OS boot data. In most scenarios, this portion of the FTL map data will not consume all of the volatile memory available to the SSD, thus leaving a portion of the volatile memory for pre-fetching the OS boot data while the IHS continues initializing the PCIe NVMe high speed queues.

If all of the OS boot data can be accommodated in the remaining available volatile memory of the SSD controller, at step 550, the entire OS boot data file is pre-fetched to this available volatile memory. Once the OS boot data has been pre-fetched to memory, at step 560, the SSD controller signals to the host IHS that the SSD is initialized and ready to receive commands. If, at step 545, the SSD controller determines that the entire OS boot data file cannot be accommodated within the available volatile memory of the SSD controller, at step 555, a portion of the OS boot data is loaded in the available volatile memory of the SSD controller. In certain embodiments, the size of the OS boot data portion that is loaded in the volatile memory is determined based on the remaining available volatile memory after loading the FTL map in memory at step 535. Once a portion of the OS boot data has been pre-fetched at step 555, at step 560, the SSD controller issues a ready signal indicating it is ready to receive commands from the host IHS.

At step 515, the host IHS determines whether the SSD has been initialized and has reported it is ready to receive commands from the host IHS. If the host IHS determines that the SSD has reported ready, at step 520, the host IHS issues an NVMe command via the PCIe connection, where the command instructs the SSD to fetch OS boot data. According to the described embodiments, the SSD is configured to pre-fetch OS boot data to memory while the host IHS is allocating the necessary memory to initialize the PCIe NVMe connection.

At step 565, the SSD controller responds to a request from the host IHS for OS boot data by transmitting the pre-fetched OS boot data to the host IHS. If the entire OS boot data file was pre-fetched to the volatile memory of the SSD controller, the complete OS boot data file is transmitted to the host IHS at step 565. If only a portion of the OS boot data could be pre-fetched in the available volatile memory of the SSD controller, that portion of the OS boot data is transmitted to the host IHS at step 565. Once this portion of the OS boot data has been transmitted, the SSD controller fetches the subsequent portion of the OS boot data stored in NAND memory. This subsequent portion is then transmitted to the host IHS and any additional portions of the OS boot data are likewise accommodated within the available space of the SSD controller volatile memory. This process is repeated until all of OS boot data has been transmitted to the host IHS. At step 565, the SSD controller loads the remaining portion of the FTL map from NAND memory. As described, the portion of the FTL map corresponding to the OS boot data is identified and stored to a pre-fetch location and the remaining portion of the FTL map is stored to a different location in NAND memory, such as a FTL backup copy location. At step 565, the SSD controller loads the remaining portion of the FTL map and is ready to begin processing memory operations on behalf of the host IHS.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for initializing a host IHS (Information Handling System) comprising a solid state storage device, the method comprising:
    initializing a PCIe (Peripheral Component Interconnect Express) connection between the host IHS and the solid state storage device;
    allocating a host memory on the host IHS, wherein the allocated host memory supports data transfers via the PCIe connection with the solid state storage device;
    loading a first set of mappings in a first portion of a volatile memory of the solid state storage device, wherein the first set of mappings identifies a location of operating system boot data in a persistent storage of the solid state storage device;
    pre-fetching at least a first portion of the operating system boot data, wherein the at least first portion of the operating system boot data is pre-fetched during at least a portion of a time required for the host memory to be allocated, and wherein pre-fetching the at least first portion of the operating system boot data comprises using the first set of mappings to identify the location of the at least first portion of the operating system boot data in persistent storage and copying the at least first portion of the located operating system boot data from the persistent storage to a second portion of the volatile memory of the solid state storage device;
    transmitting the pre-fetched at least first portion of the operating system boot data to the host IHS; and
    booting the host IHS from the pre-fetched at least first portion of the operating system boot data.

2. The method of claim 1, wherein the PCIe connection utilizes NVMe (Non-Volatile Memory Express) and wherein the host memory is allocated for use as a plurality of NVMe queues.

3. The method of claim 1, wherein the first set of mappings is a set of FTL (Flash Translation Layer) mappings that encode the location of data in the persistent storage of the solid state storage device.

4. The method of claim 3, further comprising:
    detecting an end of session command issued by the host IHS; and
    identifying the location of the operating system boot data stored in the persistent storage of the solid state storage device, wherein the operating system boot data is located by determining a last block of data received for storage from the host IHS prior to the detected end of session command.

5. The method of claim 4, further comprising:
    determining the first set of mappings corresponding to the location of the identified last block of data in the persistent storage; and
    storing the first set of mappings to a predefined location in persistent storage of the solid state storage device.

6. The method of claim 1, wherein a size of the located operating system boot data in persistent storage is greater than a size of the second portion of the volatile memory of the solid state storage device.

7. The method of claim 6, further comprising:
    pre-fetching a second portion of the located operating system boot data, wherein the second portion of the located operating system boot data is pre-fetched after the prefetched first portion of the operating system boot data has been transmitted to the host IHS, and wherein pre-fetching the second portion of the operating system boot data comprises transferring the second portion of the operating system boot data from the persistent storage to the second portion of a volatile memory of the solid state storage device.

8. The method of claim 7, further comprising:
    transmitting the pre-fetched second portion of the operating system boot data to the host IHS; and
    booting the host IHS from the pre-fetched first portion of the operating system boot data and the pre-fetched second portion of the operating system boot data.

9. A host IHS (Information Handling System) comprising:
    a host memory allocated to support data transfers via a PCIe (Peripheral Component Interconnect Express) connection to a solid state storage device;
    the solid state storage device comprising a PCIe bus interface connection, a persistent storage, a volatile memory, and a controller, wherein the controller is configured to:
        load a first set of mappings in a first portion of the volatile memory, wherein the first set of mappings identifies a location of operating system boot data in the persistent storage;
        pre-fetch at least a first portion of the operating system boot data, wherein the at least first portion of the operating system boot data is pre-fetched during at least a portion of a time required for the host memory to be allocated, and wherein pre-fetching the at least first portion of the operating system boot data comprises using the first set of mappings to identify the location of the at least first portion of the operating system boot data in persistent storage and copying the at least first portion of the located operating system boot data from the persistent storage to a second portion of the volatile memory; and
        transmit the pre-fetched at least first portion of the operating system boot data to the host IHS via the PCIe bus interface connection; and a processor configured to boot the host IHS from the pre-fetched at least first portion of the operating system boot data transmitted by the solid state storage device.

10. The IHS of claim 9, wherein the PCIe connection utilizes NVMe (Non-Volatile Memory Express) and wherein the host memory is allocated for use as a plurality of NVMe queues.

11. The IHS of claim 9, wherein the first set of mappings is a set of FTL (Flash Translation Layer) mappings that encode the location of data in the persistent storage.

12. The IHS of claim 11, wherein the controller is further configured to:
   detect an end session command issued by the host IHS; and
   identify the location of operating system boot data stored in the persistent storage of the solid state storage device, wherein the operating system boot data is located by determining the last block of data received for storage from the host IHS prior to the detected end of session command.

13. The IHS of claim 12, wherein the controller is further configured to:
   determine the first set of mappings corresponding to the location of the identified last block of data in the persistent storage; and
   store the first set of mappings to a predefined location in persistent storage of the solid state storage device.

14. The IHS of claim 9, wherein a size of the located operating system boot data in persistent storage is greater than a size of the second portion of the volatile memory.

15. The IHS of claim 14, wherein the controller is further configured to:
   pre-fetch a second portion of the located operating system boot data, wherein the second portion of the located operating system boot data is pre-fetched after the prefetched first portion of the operating system boot data has been transmitted to the host IHS, and wherein pre-fetching the second portion of the operating system boot data comprises transferring the second portion of the operating system boot data from the persistent storage to the second portion of a volatile memory.

16. A solid state storage device comprising:
   a PCIe bus interface connection (Peripheral Component Interconnect Express) to a host IHS, wherein the host IHS includes a host memory allocated to support data transfers via the PCIe connection to the solid state storage device;
   a persistent storage;
   a volatile memory;
   and a controller, wherein the controller is configured to:
      load a first set of mappings in a first portion of the volatile memory, wherein the first set of mappings identifies a location of operating system boot data in the persistent storage;
      pre-fetch at least a first portion of the operating system boot data, wherein the at least first portion of the operating system boot data is pre-fetched during at least a portion of a time required for the host memory to be allocated, and wherein pre-fetching the at least first portion of the operating system boot data comprises using the first set of mappings to identify the location of the at least first portion of the operating system boot data in persistent storage and copying the at least first portion of the located operating system boot data from the persistent storage to a second portion of the volatile memory; and
      transmit the pre-fetched at least first portion of the operating system boot data to the host IHS via the PCIe bus interface connection, wherein the host HIS is configured to boot from the pre-fetched at least first portion of the operating system boot data.

17. The solid state storage device of claim 16, wherein the controller is further configured to:
   detect an end session command issued by the host IHS; and
   identify the location of operating system boot data stored in the persistent storage of the solid state storage device, wherein the operating system boot data is located by determining the last block of data received for storage from the host IHS prior to the detected end of session command.

18. The solid state storage device of claim 17, wherein the controller is further configured to:
   determine the first set of mappings corresponding to the location of the identified last block of data in the persistent storage; and
   store the first set of mappings to a predefined location in persistent storage of the solid state storage device.

19. The solid state storage device of claim 16, wherein a size of the located operating system boot data in persistent storage is greater than a size of the second portion of the volatile memory.

20. The solid state storage device of claim 19, wherein the controller is further configured to:
   pre-fetch a second portion of the located operating system boot data, wherein the second portion of the located operating system boot data is pre-fetched after the prefetched first portion of the operating system boot data has been transmitted to the host IHS, and wherein pre-fetching the second portion of the operating system boot data comprises transferring the second portion of the operating system boot data from the persistent storage to the second portion of a volatile memory.

* * * * *